US005417363A

United States Patent [19]

Hauner et al.

[11] Patent Number: 5,417,363

[45] Date of Patent: May 23, 1995

[54] PROCESS FOR BONDING CONTACTS TO A CONTACT BASE BY HARD SOLDERING AND SEMIFINISHED PRODUCT WHICH CAN BE OBTAINED BY THIS PROCESS

[75] Inventors: Franz Hauner, Röttenbach; Manfred Schneider, Lichtenfels; Alfred Dötzer, Ebermannstadt, all of Germany

[73] Assignee: Siemens Aktiengesellschaft, München, Germany

[21] Appl. No.: 232,003

[22] PCT Filed: Oct. 22, 1994

[86] PCT No.: PCT/DE92/00005

§ 371 Date: Apr. 22, 1994

§ 102(e) Date: Apr. 22, 1994

[87] PCT Pub. No.: WO93/08583

PCT Pub. Date: Apr. 29, 1993

[30] Foreign Application Priority Data

Oct. 25, 1991 [DE] Germany .......................... 41 35 285.8

[51] Int. Cl.[6] ...................... B23K 31/02; B23K 103/16

[52] U.S. Cl. ............................... 228/262.61; 228/224; 29/879; 200/262; 200/265

[58] Field of Search ............ 228/262.1, 262.61, 124.1, 228/204, 224; 29/875, 879; 148/431; 419/21, 26; 200/262, 265, 266

[56] References Cited

U.S. PATENT DOCUMENTS

| | | | |
|---|---|---|---|
| 3,717,798 | 2/1973 | Kahn | 257/769 |
| 4,344,794 | 8/1982 | Szulczyk | 420/502 |

*Primary Examiner*—Samuel M. Heinrich

*Attorney, Agent, or Firm*—Kenyon & Kenyon

[57] ABSTRACT

Particularly in the case of contacts consisting of a silver-metal oxide-(AgMeO)-based material which are provided on their the back side with solder, it is noted, upon hard soldering, on a contact base that solder can ascend in undesired manner up to the contact surfaces. This is due to the heating upon the hard soldering. In accordance with the invention, the wettability of the side surfaces of the contacts is reduced to such an extent that the ascent of solder to the surface on the contact mating area is avoided. For this purpose, metal oxides are preferably introduced into the surfaces of the contacts. In the case of contacts having a base of silver-metal oxide (AgMeO), metal oxides which are already contained as active elements in the material can preferably be used.

13 Claims, No Drawings

PROCESS FOR BONDING CONTACTS TO A CONTACT BASE BY HARD SOLDERING AND SEMIFINISHED PRODUCT WHICH CAN BE OBTAINED BY THIS PROCESS

BACKGROUND OF THE INVENTION

The present invention relates generally to processes for bonding contacts to contact bases, and more particularly to a process for bonding a contact to a contact base, in which the contact consists of a silver-metal oxide-(MeO)-based material, in which each individual contact, which has a surface on the contact mating area, side surfaces, and a back side for bonding to the support, is provided with solder on the back side. As used herein, contacts are to be understood as separate contact pieces or else tapes or shapes for the cutting off of individual contact pieces. The present invention also relates to a semifinished product which can be obtained by the process indicated.

U.S. Pat. No. 3,954,459 discloses process for manufacturing a sintered compound material for electric contacts, in particular for power engineering, in which a silver-metal oxide material is used. Cadmium oxide (CdO), stannic oxide ($SnO_2$), zinc oxide (ZnO), lead monoxide (PbO) or ferriferrous oxide ($Fe_3O_4$) or their mixtures are often considered for use as metal oxides in this application. In the case of these contact materials, in view of their poor wettability by liquid solder or their unfavorable welding properties, two-layer contact pieces having a layer of readily solderable or readily weldable metal are produced in order to obtain a reliable bonding technique. Single-layer contacts can possibly be imparted better soldering properties by dissolving the metal-oxide components on the solder side, such as by acid, for example.

Furthermore, U.S. Pat. No. 3,989,516 discloses a process for producing a material serving as an electrical contact, in particular on the basis of silver-cadmium oxide with possibly stannic oxide, in the case of which is the disturbing fact that in the prior art a non-homogeneous distribution of concentration with accumulations of cadmium oxide in the surface region of the contact pieces is formed. The specific problem of the bonding of the contacts to contact bases is not mentioned therein.

In the manufacture of switching devices, contact pieces are customarily fastened to the contact bases of the switching device by hard soldering. For this purpose, a film of solder is applied to the back side of the contact pieces or of the material which is present in the form of a longer tape, for example by roll-bonded cladding or the soldering-on of individual solder spots. Films of solder can also be bonded by ultrasonics and then pressed in place. The presoldered contact pieces are additionally processed substantially automatically and fastened to the contact base as part of an integrated manufacturing process, for instance by inductive heating.

In such energy-induced processes, problems can arise due to liquid solder ascending from the solder side over the narrow edges of the contact and coming onto the surface of the contact mating area. The switching behavior of the contact can be affected in an undesired manner by such uncontrollable processes upon use of the switching device in accordance with its intended purpose.

The present invention is directed to the problem of developing a process for the treatment of contacts by which the presence of parts of solder on the surface of the contact mating area of the contact after the hard soldering is prevented. The present invention is also directed to the problem of producing a semifinished product according to the process of the present invention.

SUMMARY OF THE INVENTION

The present invention solves this problem by providing that before the soldering process, metal oxides, in addition to the metal oxides already present within the contact, are introduced into the side surfaces and possibly into the contact, so that the wettability of the side surfaces of the contact is reduced, and the ascent of solder onto the surface on the contact mating area is thereby avoided.

In the process of the present invention, one or more of the following components are used as metal oxides: stannic oxide ($SnO_2$), bismuth trioxide ($Bi_2O_3$), cupric oxide (CuO), tantalum oxide ($Ta_2O_5$), indium oxide ($In_2O_3$), tungsten trioxide ($WO_3$) or molybdenum trioxide ($MoO_3$). In particular, in the case of silver-metal oxide based materials, metal oxides which are already present in the contact material can be used. In this way, influencing the switching properties of the contact made from the material is minimized.

In accordance with the present invention, a hard, cold-deformable solder into the surface of which only a small amount of metal oxide can be introduced is preferably applied to the back side of the contact in order to attach the contact to the base by hard soldering before the introduction of the surface oxides.

By the present invention there is therefore made available a semifinished product, in which there is a higher concentration of at least one of the metal oxides either on the narrow sides, in the case of separate contact pieces, or on the side surfaces, in the case of tapes or shapes, and in both cases, possibly, also a contact surface, than within the contact piece or the tape or shape.

As an advantageous further development of the present invention, in a subsequent process step after the hard soldering of the contact on the contact base, the metal oxides are removed from the free surfaces, at least from the contact surface. Since during the course of the manufacture a pickling of the contact surfaces is ordinarily then effected, metal oxides which can be removed by the pickling can therefore be employed. Furthermore, a hard solder and particularly cold-deformed solder can be used, so that only a small amount of metal oxide is introduced into the surface on the solder side.

For the introduction of metal oxides into the surfaces of the contacts known methods are available: They comprise alternately blasting with the metal oxides as blasting agent or vibratory grinding with the addition of metal oxides. This latter can be effected with or without additional grinding stones.

Further details and advantages of the invention will become evident from the following description of embodiments.

DETAILED DESCRIPTION

The invention has been tried out in detail with contact pieces consisting of silver-metal oxide (AgMeO) for use in switching devices of power engineering. In this connection, specific compositions of contact materials of $AgSnO_2Bi_2O_3CuO$ are described.

Example 1

Contact pieces of the above materials produced by known processes are developed for instance as block-shaped bodies with dimensions of 13 mm×13 mm×2.5 mm. The bonding of the contact pieces to the contact base in the electric-switching device is customarily effected by hard soldering. For this, films of solder are first of all fastened onto the one base surface of the contact pieces. These contact pieces, which have thus been presoldered, can then be fed automated as part of an integrated manufacture to the assembly line for switching devices and bonded to the contact base by the feeding of energy, for instance by inductive heating.

Upon the inductive heating, the solder melts. Even if the solder is limited to the bottom of the contact pieces and rests directly on the contact base, the solder can move up. As a result, such changes on the surface of the contact piece are produced at times as to change the switching properties during the life of the switching device.

In order to prevent this last-mentioned undesired effect, the wettability of the side surfaces of the contact pieces is reduced to such an extent prior to the actual hard soldering process that the ascent of solder to the surface of the contact mating area is avoided. For this purpose, metal oxides are introduced into the surfaces of the contact piece.

In the case of a contact piece having the constitution $AgSnO_2Bi_2O_3CuO$, it is advisable to use, in particular, bismuth trioxide ($Bi_2O_3$) or cupric oxide (CuO) as the metal oxide to be introduced. This introduction is preferably effected by blasting with bismuth trioxide as blasting agent. For this purpose, the contact pieces are preferably applied with their soldered side downward onto the base and the base conducted through a blasting station. This process can be carried out continuously. Similarly, a continuous process can be used in the case of a presoldered tape or shape for the subsequent cutting to length of individual contact pieces.

It has been found that the small additional amounts of bismuth trioxide which are introduced into the free surfaces of the contact piece in general scarcely change the switching properties of the contact pieces since, in particular, the contact material also already contains bismuth trioxide. However, an increase in the concentration of bismuth trioxide which is significant in the sub-$\mu$m range results in the surface region of the contact piece which has thus been prepared as semifinished product. Since, however, the contact pieces are ordinarily pickled in the course of the further manufacture of the switching device, the bismuth trioxide introduced can still be removed during the manufacturing process if a suitable pickling agent is used. Hydrochloric acid (HCl), which dissolves bismuth trioxide, is suitable as pickling agent.

Example 2

The base surfaces of unsoldered or soldered contact pieces are stacked on each other so that in a stack having a large number of contact pieces only the four narrow sides of which are free, while both the contact surface and the solder surfaces are covered. Such a stack is pushed through a blasting station in a manner corresponding entirely to Example 1. In this connection, by additional rotation of the stack around its longitudinal axis, the result can be obtained that bismuth trioxide or cupric oxide is always incorporated uniformly only into the side surfaces of the contact pieces. The hard-soldering process can immediately follow this.

Example 3

Unsoldered or soldered contact pieces are subjected to vibratory grinding in a drum, the metal oxide in question being added as a powder. The vibratory grinding can be effected with or without the use of the grinding stones customary in practice.

In order to exclude in advance any disadvantageous effect of the solder film in the case of contact pieces provided with solder, it is advisable to use a hard solder, particularly also a cold-deformed hard solder, in the case of which fewer oxides are introduced into the surface due to the high hardness values. Since the above-indicated material has a hardness of about 90 HV, a solder which in cold-deformed condition has a hardness of 150 HV should be used, for instance the known L-Ag 15P solder.

The present invention has been described in particular for contact pieces which consist of silver-metal-oxide (AGMeO). A corresponding process for reducing the wettability of the side surfaces of the contact pieces can be used also for other contact-material systems, for instance ones having a base of silver-graphite (AgC), silver-tungsten (AgW), or combinations thereof, in order to prevent the ascent of the solder. In the individual case it may be necessary to employ conditions which do not substantially influence the switching properties. In addition to contact pieces, tapes of shapes which are clad with solder can, in particular, be formed in this way into a suitable semifinished product in which only the narrow sides or narrow edges are affected in the desired manner, while the surfaces on the contact mating area remain substantially unchanged.

We claim:

1. A method for bonding a contact to a base by hard soldering, in which the contact is made of a silver-metal oxide (AgMeO)-based material, said contact having a contact surface on a contact mating area, a contact surface on both side surfaces and a contact surface on a back side for attachment to the substrate, and the contact surface on the back side is provided with solder, said method comprising the step of introducing additional metal oxides into the side surfaces and into the contact surface before soldering, wherein the additional metal oxides are in addition to those metal oxides already present within the contact, whereby wettability of the side surfaces of the contact is reduced to such an extent as to prevent the hard solder from ascending to the surface of the contact mating area.

2. The method according to claim 1, wherein the additional metal oxides contain stannic oxide ($SnO_2$), bismuth trioxide ($Bi_2O_3$), cupric oxide (CuO), tantalum oxide ($Ta_2O_5$), indium oxide ($In_2O_3$), tungsten trioxide ($WO_3$) or molybdenum trioxide ($MoO_3$) as one or more components.

3. The method according to claim 1, wherein the contact comprises an AgMeO-based material, and the step of introducing further comprises introducing metal oxides that are also contained as active component in the contact material.

4. The method according to claim 3, wherein the contact comprises a material having the constitution $AgSnO_2Bi_2O_3CuO$, and the step of introducing further comprises introducing $SnO_2$, $Bi_2O_3$ and/or CuO into the contact of $AgSnO_2Bi_2O_3CuO$.

5. The method according to claim 1, further comprising the step of removing the additional metal oxides from the free surfaces, and at least from the contact surface on the contact mating area after the hard soldering of the contact on the base.

6. The method according to claim 5, further comprising the step of removing the additional metal oxides by pickling, wherein metal oxides which are dissolved by a pickling agent used in the step of removing by pickling are employed as the additional metal oxides.

7. The method according to claim 6, wherein hydrochloric acid (HCl) is used as the pickling agent and bismuth trioxide ($Bi_2O_3$) and/or cupric oxide (CuO), both of which are dissolved by hydrochloric acid (HCl), are used as the additional metal oxides.

8. The method according to claim 1, further comprising the step of applying a hard cold-deformed solder to the back side of the contact before introducing the additional metal oxides, wherein the hard cold-deformed solder is used for attaching the contact to the base by hard soldering, and only a small amount of metal oxide can be introduced into the surface of the hard cold-deformed solder.

9. The method according to claim 1, wherein the step of introducing the additional metal oxides is accomplished by blasting with the additional metal oxides acting as blasting agents.

10. The method according to claim 1, wherein the contact comprises separate contact pieces, and the step of introducing the additional metal oxides is accomplished by vibratory grinding with the additional metal oxides.

11. The method according to claim 10, wherein the vibratory grinding is accomplished using grinding stones.

12. A semifinished product made by a method for bonding a contact to a base by hard soldering, in which the contact is made of a silver-metal oxide (AgMeO)-based material, and the contact has a contact surface on a contact mating area, a contact surface on both side surfaces and a contact surface on a back side for attachment to the base and the contact surface on the back side is provided with solder, wherein the method includes introducing additional metal oxides into the side surfaces and into the contact surface before soldering, the additional metal oxides are in addition to those metal oxides already present within the contact, thus reducing wettability of the side surfaces of the contact to such an extent as to prevent the hard solder from ascending to the surface of the contact mating area, and the contact is formed by separate contact pieces on narrow sides and on the contact surface of which there is a higher concentration of at least one of the metal oxides than within the contact pieces.

13. A semifinished product made by a method for bonding contacts to a base by hard soldering, in which the contacts are made of a silver-metal oxide (AgMeO)-based material, each individual contact having a contact surface on a contact mating area, a contact surface on both side surfaces and a contact surface on a back side for attachment to the base, and the contact surface on the back side is provided with solder, wherein the method includes introducing additional metal oxides into the side surfaces and into the contact surface before soldering, the additional metal oxides are in addition to those metal oxides already present within the contacts, wettability of the side surfaces of the contacts is reduced to such an extent as to prevent the hard solder from ascending to the surface of the contact mating area, and the contact is formed by tapes or shapes on narrow sides and on the contact surface of which there is a higher concentration of at least one of the metal oxides than within the tape or shape.

* * * * *